United States Patent [19]

Roselli et al.

[11] 3,934,111

[45] Jan. 20, 1976

[54] APPARATUS FOR HEATING A WINDOW

[75] Inventors: Sergio Roselli, Pisa, Italy; Gerd Sauer, Aachen-Laurensberg, Germany

[73] Assignee: Saint-Gobain Industries, Neuilly-sur-Seine, France

[22] Filed: Feb. 15, 1974

[21] Appl. No.: 442,831

[30] Foreign Application Priority Data

Feb. 16, 1973 France ............................. 73.05468

[52] U.S. Cl. ............... 219/203; 15/250.05; 52/171; 219/219; 219/491; 219/522; 340/235
[51] Int. Cl.² ..................... H05B 1/02; E06B 7/12
[58] Field of Search ........... 219/203, 202, 522, 547, 219/543, 213, 219, 508, 491; 338/35; 200/61.04, 61.05, 61.06; 340/234, 235; 52/171; 15/250.05; 318/483

[56] References Cited
UNITED STATES PATENTS

| | | | |
|---|---|---|---|
| 2,049,321 | 7/1936 | Sampson...................... | 200/61.04 X |
| 2,557,905 | 6/1951 | Burton et al...................... | 219/213 |
| 3,194,960 | 7/1965 | Tuttle ............................. | 219/213 X |
| 3,200,705 | 8/1965 | Voelker et al.................. | 219/219 X |
| 3,540,655 | 11/1970 | Hinrichs........................ | 219/522 UX |
| 3,749,885 | 7/1973 | Nagasima............................ | 219/203 |

Primary Examiner—A. Bartis
Attorney, Agent, or Firm—Pennie & Edmonds

[57] ABSTRACT

A grid of heating conductors for defrosting applied to the window of a vehicle is connected to a source of electrical energy through a relay-operated switch. This switch is closed either in response to a drop in the resistance between two conductors or electrodes mounted in spaced relation on an insulating support such as the window (the drop occurring by accumulation of moisture on the support and between the conductors) or in response to a drop in temperature at or near the window. For this purpose the resistance between the two conductors over the surface of the support may be paralleled by a thermostatic switch which closes with drop in temperature, both this resistance and the thermostatic switch being in the input to a trigger circuit controlling the relay to energize it in response to a decline in resistance at that input. Alternatively the trigger circuit may include thermistors which sense the drop in temperature and set the trigger circuit to the condition which energizes the relay.

9 Claims, 5 Drawing Figures

Thermostatic Switch

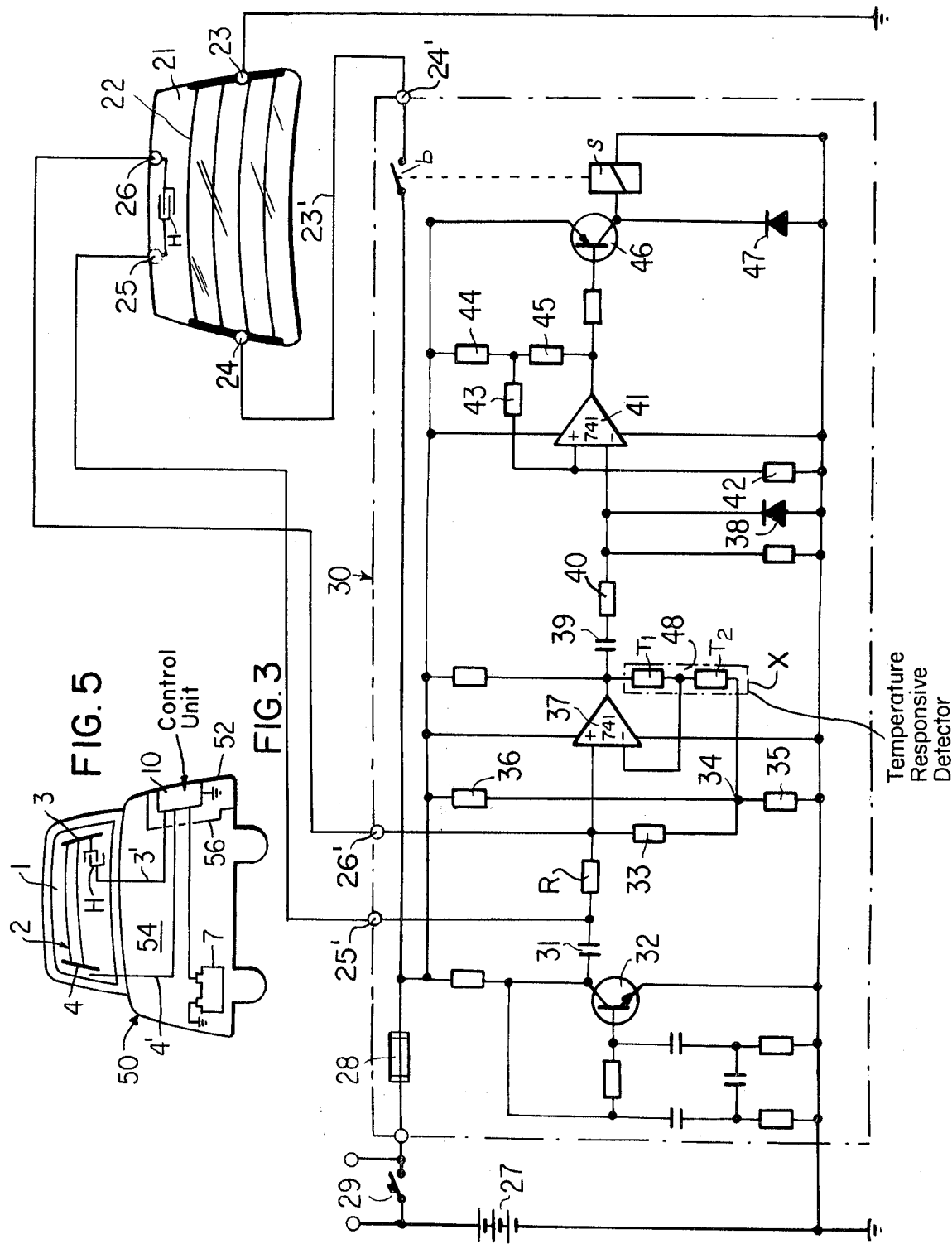

APPARATUS FOR HEATING A WINDOW

The present invention pertains to apparatus for automatic control of electric heaters applied to vehicle windows for removal of fog or ice therefrom.

Electric heaters are widely used for this purpose on the windshields or rear windows of automotive vehicles. These heaters may comprise strips of conducting material applied to the glass or other transparent material of which the window is made. The strips may be made of a paste of finely divided silver suspended with a binder in a frit. The strips may be applied to the window by the silk screen process and thereafter baked thereon, and then optionally reinforced by coatings of copper or nickel applied by chemical or galvanoplastic processes.

Operation of such a heater typically requires from 100 to 150 watts. Consequently it is desirable to control such operation automatically. When the heater is controlled manually, even with a signal lamp to remind the driver of the vehicle that the heater is energized, it often occurs that the driver neglects to turn the heater off when its further use is unnecessary.

The use of a timed relay or similar device to shut the heater off after a fixed or adjustable interval arguably constitutes an improvement, but the result is still unsatisfactory since such a device must in general be set for the longest anticipated required time of operation. It has hence been recognized as desirable to control the operation of such heaters by means of a detector of humidity or of frost, and apparatus of this kind is disclosed and claimed in the copending application of Hans Dieter Edel, Ser. No. 465,164 filed Apr. 29, 1974, a continuation-in-part of application Ser. No. 227,074, filed Feb. 17, 1972 now abandoned and assigned to the assignee hereof. In the apparatus there disclosed, the humidity detector comprises two electrodes disposed in spaced-apart relation on the inside surface of the window whose heater is to be controlled. With decline in the resistance between the two electrodes due to accumulation of moisture on the surface of the window between those electrodes, a trigger circuit responds to such decline in resistance and energizes a relay to connect the heater grid to the vehicle battery.

Such a device effects a desirable economy of energy from that battery, which possesses of course a limited capacity. In general, it automatically maintains good visibility through the window so long as the temperature on the inside face thereof is below the dew point of the atmosphere inside the vehicle, i.e., in cool, humid weather and also in the case of snowfall or of the formation of frost on the exterior surface of the window. It has been found however that under particular atmospheric conditions this control device is slow to energize the heater. This may occur for example when the vehicle has been left for a long time outdoors in winter, the outside of the window being covered with snow, frost or ice while the inside face remains dry. It is then necessary for the dew point to be raised inside the vehicle by the presence of occupants so as to result in the condensation of moisture on the inside face of the window where the detector is located in order for the latter to energize the heater. Similarly, even if frost has formed on the inside surface of the window, it may not sufficiently reduce the resistance of the path over the glass between the two electrodes of the humidity detector to cause the circuit to operate and energize the heater.

It is therefore an object of the invention to provide means for automatically controlling operation of window heaters of vehicles. To this end the invention provides on the inside of the vehicle two detectors responsive to different local atmospheric conditions. The first or principal detector is a humidity detector of the type already described, on the inside face of the window. The second or auxiliary detector detects the presence of low temperatures and thereupon energizes the heater if the humidity detector has not done so.

The shortcomings of the prior art systems hereinabove cited occur only in cold weather. Applicants have thus found that it is possible to replace the humidity detector, until the latter is rendered operative by rise of temperature inside the vehicle, by means of such an auxiliary detector, whose operation does not depend on the formation of a conductive coating or deposit on the inside of the window to which the heater is applied. Applicants have found that there exist within the vehicle, preferably toward the front thereof and along its exterior walls, regions which are protected from action of the space heater of the vehicle (to be distinguished from the window heaters with which the invention is concerned) where the atmospheric conditions reflect, with a time delay, those existing in the vicinity of the window which bears or incorporates the window heater to be controlled. This window may be, for example, either the windshield or the rear window of the vehicle.

Thus, for control of a rear window heater having a humidity detector thereon, it is possible to take advantage of the fact that the temperature in the front of the vehicle is close to that which exists in the immediate vicinity of the rear window, but that the humidity is usually higher in the front, e.g., at locations on the windshield where condensation rapidly forms in cold weather from the presence of the driver's body as soon as he enters the vehicle.

According to one embodiment of the invention therefore, for control of a rear window heater, having a humidity detector thereon, the auxiliary detector can take the form of a second humidity detector on the inside of the windshield in front of the driver's position, at the lower edge of the windshield and preferably outside the field of action of the hot air blower provided for space heating of the vehicle or for defrosting of the windshield with heat derived from the engine.

According to another embodiment, the humidity detector is on the window or windshield to be heated, the auxiliary detector is responsive exclusively to the temperatures existing in a suitably selected location inside the vehicle, preferably one sufficiently sheltered from the space heater of the vehicle but nevertheless sufficiently responsive to outside temperatures so as to take up temperatures between the inside and outside temperatures. Such locations exist behind the dashboard and against the outer wall of the vehicle, for example. Advantageously the auxiliary detector is then incorporated into a window heater control unit mounted against or along the exterior of the vehicle body. The temperature at which, or the range of temperatures within or over which, the auxiliary detector responds to temperature change may be in the vicinity of 0°C. The value to be given to this temperature or temperature range and the location of the window heater control unit obviously depend upon the construction of the vehicle and must be experimentally determined.

Such an auxiliary detector operates to control the window heater whatever the degree of ambient humidity inside the vehicle but it does not energize the heater unnecessarily. Experience shows that when the outside temperature is below 0°C. the presence of the driver in the vehicle results in the deposition of condensation or even of frost sufficient to render the humidity detector operative, if the temperature inside is high enough, and that with his presence this temperature is soon reached so that control of the window heater is returned to the primary, humidity detector. Of course the window heater circuits should be wired through or otherwise controlled by the ignition switch of the vehicle.

In this second embodiment wherein the auxiliary detector is a temperature-responsive one, various types of temperature detectors may be employed. According to one presently preferred construction, the temperature detector may comprise a simple thermostatic switch including a bimetallic strip, the strip closing when the temperature drops below 0°C. and this switch being mounted in parallel to the humidity detector. Both detectors may then be in the input of an amplifier including a trigger circuit or flip-flop whose output controls a relay which in turn controls energization of the window heater.

According to another embodiment, thermistors are employed to shift reversably, with change of temperature, the conduction state of the flip-flop.

The invention will now be further described in terms of a number of presently preferred exemplary embodiments and with reference to the accompanying drawings in which:

FIGS. 2 and 3 are diagrams illustrating two embodiments of the invention;

FIG. 5 is a diagrammatic representation of a vehicle incorporating one embodiment of the invention.

Figure 1:
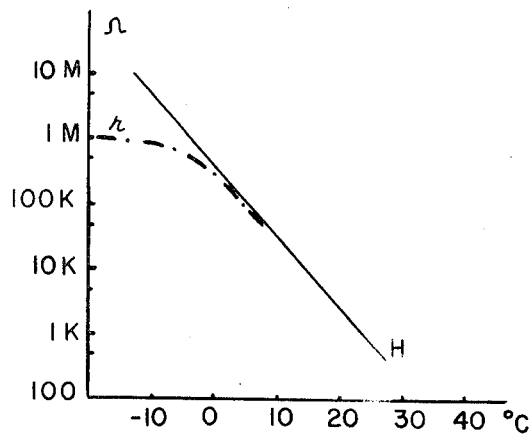
FIG. 1 is a graph showing the variation in resistance of a humidity detector as a function of temperature.

Referring first to FIG. 1, there is shown in this figure, in the full line curve thereof, a graph indicating the variation with temperature of the resistance between the two terminals of a two-electrode humidity detector of the type shown at H in FIG. 2, already described hereinabove and further described below, for a given state of moisture between the electrodes thereof. While the numerical data represented by the full line curve in FIG. 1 are for a particular detector, the curve is representative of the behavior of such detectors generally. The curve shows that, for a given layer of moisture between the two electrodes of the detector, the resistance between those electrodes increases as temperature falls, rising to very high values at temperatures in the vicinity of 0°C. and below.

Since the detector is to be responsive to variations in inter-electrode resistance due to changes in humidity conditions there, variations due to temperature change alone may impair proper functioning of the detector, especially at low temperatures.

The full line curve of FIG. 1 thus illustrates the problem to which the invention is directed, and which besets the apparatus disclosed in the copending application above-identified.

Figure 2:
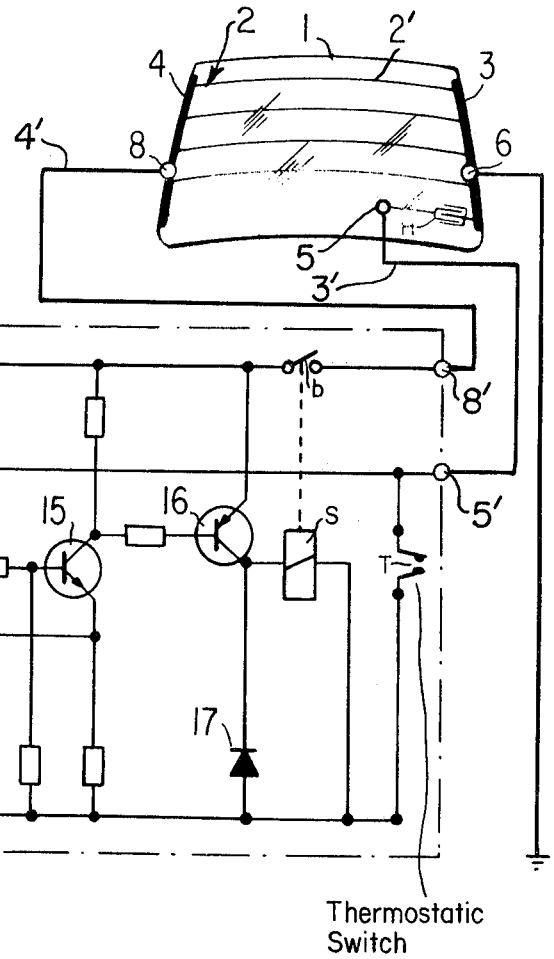

Referring now to FIG. 2, there is there shown in diagrammatic pictorial fashion a window 1 such as a windshield or rear window of an automotive vehicle, bearing a heater or defroster grid generally indicated at 2, including conductive resistance strips 2'. These extend approximately or substantially geometrically parallel to each other over the portion of the window of interest at a spacing from each other which may be of the order of some centimeters. These conducting strips are connected electrically in parallel between bus bars 3 and 4 having terminals 6 and 8 respectively. There is also applied to an exterior surface of the window, preferably that which is turned to the inside of the vehicle, a humidity detector H. This detector includes two conductors or electrodes on the same face of the window. These electrodes are out of contact with each other but are separated by a spacing of the order of a millimeter or less. In the sensor H one electrode may connect to one of the bus bars as indicated at 3. The other leads to an independent terminal 5. The two electrodes of the sensor may take the form of two intercalated combs, the adjacent portions of the two combs being separated by a distance of about 0.3 to 0.4 mm. and having a developed length of about 150 mm.

Applicants have found that it is possible to deposit directly on the glass of a window, by the silk screen process, conductors of this type capable of operating as a detector and capable of operating over resistance ranges between $10^4$ and $10^7$ ohms with currents of the order of a few microamperes, making the detector H relatively insensitive to electrolytic phenomena. The window with its defroster grid and humidity sensor may be of the type illustrated in FIG. 1 or in FIGS. 1 and 2 of the above mentioned abandoned application of Hans Dieter Edel, Ser. No. 227,074, filed Feb. 17, 1972, and assigned to the assignee hereof. The strips 2', bus bars, detector H and the leads for the latter to terminals 5 and 6 may but need not be laid down by the process hereinabove described.

In the circuit of FIG. 2 the terminal 6 for the bus band 3 is grounded as is the negative pole of the source of electrical energy for the vehicle, indicated as a battery 7. The terminal 8 of the bus band 4 connects via a lead 4' to a terminal 8' of a control unit identified by the dash line box 10. Terminal 5 of the detector H connects via a lead 3' to another terminal 5' on the control unit 10. This control unit may have its components assembled within a suitable container which also includes the thermostatic switch T to be described presently and which may be mounted against the outside sheet metal of the vehicle body, although on the inside thereof, in order that when the vehicle is not in use that switch T will be subjected essentially to outdoor ambient temperature.

The terminal 8' leads through the normally open contact b of a relay S to the signal input terminal 9' of the control unit. A manually operable switch 9, which may be coupled to the ignition switch of the vehicle to be closed when the ignition is turned on, applies power from the source 7 to the terminal 9'. Accordingly with switch 9 closed, power will be applied by the source 7, for example in the form of 12 volts D.C., to the heating grid 2 on the window whenever contact b is closed.

The control unit 10 includes in addition to the thermostatic switch T and the relay S a circuit to control energization of that relay. This circuit comprises essentially a first transistor 11 connected at 12 to the terminal 5' and thereby to the detector H, the detector H constituting the input impedance to this transistor. Transistor 11 is connected in an emitter base circuit so as to effect preamplification. It is followed by an amplifying stage comprising the transistor 13, which controls a two-level flip-flop including transistors 14 and 15. The flip-flop in turn controls a power stage comprising the transistor 16 which is connected in series with the actuating coil of the relay S and which is protected by the diode 17.

In accordance with the invention, energization of the defroster grid 2 is controlled not only by the humidity detector H but also by the thermostatic switch T, the latter constituting an auxiliary detector which is responsive to temperature and which is included in the control unit 10. This detector T comprises in the embodiment of FIG. 2 a switch including a bimetallic element which causes the switch to close with declining temperature. Switch T may be set to close when the temperature of the bimetallic element thereof falls to a selected value which may be in the vicinity of 0°C. Conversely, the contacts of the switch T open when the temperature at the detector rises above that value. The switch T is connected electrically in parallel with the humidity detector H, i.e., between the terminals 5' and ground in the circuit of FIG. 2, at the input to the transistor 11.

Provided of course the switch 9 is closed, the contact b is thus closed by the relay S, and the heating grid 2 is so energized, whenever either of the detectors H and T becomes sufficiently conductive. That is to say, either upon the formation of a deposit of humidity at the detector H, from whatever cause, or when the temperature at the detector T falls sufficiently. This latter condition will notably be fulfilled when the vehicle is to be set into operation from a cold start in cold weather.

FIG. 3 illustrates another embodiment of the invention. It shows a window 21, similar to the window 1 of FIG. 2, provided with a heater grid 22 and with a humidity detector H which may be of the same construction as in the embodiment of FIG. 1, on the face of the window turned to the inside of the vehicle. The bus bands possess terminals 23 and 24. The humidity detector H disposed in the upper portion of the window, optionally near the middle thereof, includes terminals 25 and 26. Terminal 23 for the heater grid 22 is connected through ground to the vehicle battery 27. Terminal 24 is connected via lead 23' to terminal 24' of a control unit identified at dash line box 30 which may be mounted in the vehicle in the same manner as control unit 10 of FIG. 2, or which may be mounted in the engine compartment of the vehicle.

Terminal 24' connects in this unit through the normally open contact b of a relay S to a fuse 28 and thence, outside of the control unit, through a switch 29, like the switch 9 of FIG. 2, to the opposite pole of the vehicle battery 27.

The two terminals 25 and 26 of the detector H are connected by leads as shown to the input terminals 25' and 26' of the control unit 30. A shunt resistor R connects these terminals and has a value of the same order of magnitude as the maximum resistance of the detector H, for example, 1 megohm.

The terminal 25' is fed through a capacitor 31 from an oscillator which provides an alternating current signal and which comprises a transistor 32 connected in an oscillating circuit of known type. This oscillator circuit delivers an alternating current voltage of the order of 1 volt and of a frequency of the order of 1000 hz.

The terminal 26' is connected through a resistor 33 to the mid-point 34 of a voltage divider which comprises resistors 35 and 36. The junction is thus held at an average voltage in the vicinity of 6 volts. This arrangement makes it possible to apply to the detector H a low-valued alternating current voltage and eliminates all risk of deterioration even when the climatic conditions are severe. The control unit 30 also encloses an amplifier, a rectifier, a flip-flop responsive to two different input levels for shifting its conductive status in opposite directions, a power stage, and a relay S as in FIG. 2 driven by that power stage.

The amplifier comprises an integrated circuit 37 of the type known by the model number 741. Its positive input terminal is connected to the terminal 26' and thus receives an alternating signal whose amplitude is an inverse function of the resistance of the principal detector. Thus, the higher the resistance at H, the higher the resistance of the parallel combination of R and H, and the smaller the fraction of the output of oscillator 32 appearing across the input of amplifier 37. The output from the amplifier is moreover affected in amplitude by the resistances of thermistors T1 and T2 in a manner presently to be described.

The output of amplifier 37 is applied through an RC circuit comprising capacitor 39 and resistor 40 to a rectifier including diode 38. The rectified signal so obtained is applied to a flip-flop or trigger circuit which includes an integrated circuit 41 of the same type as that of the amplifier 31. Its negative input terminal receives the rectified signal and its positive input terminal receives the voltage measured between the resistor 42 and a feedback resistor 43. In this way, and ignoring for the moment the thermistors T1 and T2, when the resistance at detector H falls sufficiently, due to the accumulation of moisture between its electrodes on window 21, the input signal to amplifier 37 will rise to a level such that the rectified output of the amplifier will shift trigger circuit 41 to that one of the latter's two states of conduction in which the power transistor 46 is rendered conducting. This energizes relay S, closes contact b and results in the application of power to the heater grid. The properties of the trigger circuit are such that, if for example the input level at the negative terminal of amplifier 41 which shifts the trigger circuit to the state of conduction just described is 2 volts positive with respect to ground when that input level is rising from smaller to greater positive values, then the trigger circuit will not revert to its opposite state of conduction, in which transistor 46 is effectively cut off, until that input level at the negative terminal to amplifier 41 falls back to a lower level, for example below 1 volt positive with respect to ground. The value selected for the resistors 44 and 45 which supply the feed back circuit including resistor 43 controls the separation of these two input levels at which the trigger circuit shifts its state of conduction.

The trigger circuit 41 thus turns on or off the power stage comprising transistor 46 which is connected in the supply circuit of the relay S. The transistor 46 is protected by a diode 47.

In accordance with the invention, the control unit further comprises an auxiliary detector responsive to temperature as such, identified in FIG. 3 by the dash-line box X, and comprising in the example illustrated two thermistors T1 and T2. These are connected in series at the output of amplifier 37, and their junction 48 provides negative feedback to amplifier 37 to alter the gain thereof.

The thermistor T1 is a resistance of negative temperature coefficient whereas the thermistor T2 possesses a positive temperature coefficient.

If $\theta$ is the temperature existing at the thermistors and if $t1$ and $t2$ are the resistances of the thermistors T1 and T2 at this temperature, then the feedback voltage existing at the terminal 48 is proportional to $t2/t1$ and the total gain G of the amplifier is reduced by a factor $t1/t2$.

Figure 4:
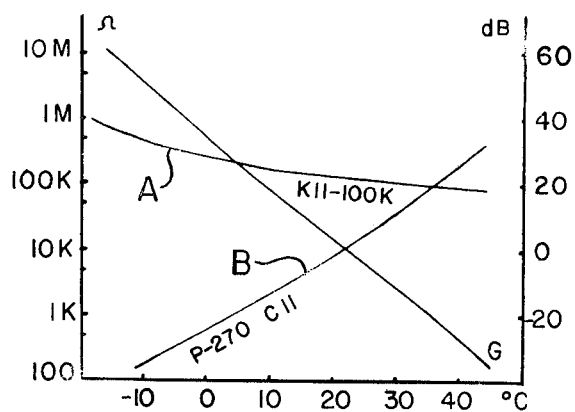
FIG. 4 is a graph showing the properties of a temperature detector employing two commercially available thermistors, and showing also the variation with temperature of the gain of an amplifier forming part of the embodiment of FIG. 3 and employing such thermistors.

FIG. 4 illustrates the properties of two thermistors of commercially available type as sold by Siemens & Halske which are suitable for use as the thermistors T1 and T2 of FIG. 3. In that figure curve A shows the variation of resistance with temperature of one thermistor of type K-11-100K suitable for use as the thermistor T1 of FIG. 3 and curve B shows that of a thermistor of type P 270 C11, suitable for use as the thermistor T2. The curve G shows the reduction in gain for amplifier 37 with increasing temperature. The use of a single thermistor is also possible to obtain such a marked change in amplifier gain with temperature.

As long as the temperature inside the vehicle (and more particularly at the location of thermistors T1 and T2) remains low, e.g., below freezing, those thermistors will give to amplifier 37 a high gain. This will compensate for the low input signal which the amplifier will receive due to the high resistance exhibited at such temperatures by the detector H, despite the possible presence of frost on the window 21 between the electrodes of that detector. As long therefore as the temperature of the thermistors remains low, trigger circuit 41 will be held in the state of conduction thereof which causes transistor 46 to conduct, thereby energizing relay S and energizing in turn the heater grid 22. The shunt resistor R insures that, however high the resistance of the detector H, a sufficient portion of the output of oscillator 32 is applied to amplifier 37 to achieve the result just described, given the attendant high gain conferred on that amplifier by the thermistors.

The operation of the embodiment of FIG. 3 can be further described in exemplary terms as follows:

1. Ambient temperature above freezing, of 10° to 20°C. for example. Let it be assumed that the vehicle is at rest with switch 29 open and the heating grid 22 accordingly de-energized. Let the driver enter the vehicle and close switch 29. A film of moisture soon condenses on the window, lowering the resistance of detector H to a value of the order of $10^4$ ohms, for example. This produces an input signal to amplifier 37 high enough, despite the relatively low gain possessed by that amplifier at such temperature, to produce conduction in transistor 46 and consequent energization of relay S and of the heater grid 22. The moisture on the window is thereupon dissipated by evaporation, the resistance of the detector H rises, to a value of the order of $10^5$ ohms for example, the input to amplifier 37 declines, and trigger circuit reverses conduction phase to cut off conduction in transistor 46 and thereby to de-energize the heater grid. 2. Formation of frost—Decline of temperature at the auxiliary detector X progressively raises the gain of amplifier 37 and thereby the value of resistance of detector H at which, or the range of values of that resistance within or over which, trigger circuit 41 will with changes in that resistance by shifted from one conduction state to the other to turn the heater grid on or off. With a gain for amplifier 37 of 500, this value of resistance may reach $5.10^5$ ohms.

3. Vehicle at rest for a long time at low temperature—As soon as the ignition switch is closed, the presence of the shunt resistor R will suffice to energize the heater grid 22, however high the resistance of detector H. The rise in temperature in the interior of the vehicle, from operation of its engine or from the presence of its occupants, will progressively reduce the gain of amplifier 37 by action of the auxiliary detector X. When the temperature in the colder portions of the vehicle interior rises sufficiently above 0°, normal operating conditions will be restored. Grid 22 will be de-energized unless there remains moisture or frost at the detector H. Further operation is then as set forth hereinabove at (1).

FIG. 5 shows schematically an automotive vehicle, generally indicated at 50, having a rear window 1 which bears a heater grid 2 and a humidity detector H connected to a control unit 10 which is mounted against the outside sheet metal 52 of the vehicle, all as hereinabove described. The control unit 10 is separated from the passenger compartment 54 of the vehicle by a partition 56.

It will thus be seen that the invention provides apparatus for heating a vehicle window comprising a plurality of heating conductors such as the conductors 2' and 22 of FIGS. 2 and 3 applied to the window, a switch such as the switch b of those figures for connection of those conductors to a source of electrical energy, a first means such as the humidity detector H to control that switch, these first means being responsive to an atmospheric condition at a first location adjacent the window, and second means such as the thermostatic switch T of FIG. 2 or the detector X of FIG. 3 to control that switch b, these second means being responsive to an atmospheric condition at a second location adjacent the window.

The first and second means may each comprise a humidity detector. In certain preferred embodiment however, the second means comprise instead means to close the switch b upon appearance of a temperature below a specified value at the location of those second means. Desirably, although not necessarily, the first of these two locations is on the window itself, on the face thereof turned toward the interior of the vehicle, and the means there located to control the switch b take the form of a humidity detector comprising two electrodes disposed in spaced apart relation there (as in the detector H of FIGS. 2 and 3), and means responsive to a decline in the resistance between those electrodes such as occurs in the presence of water between those electrodes.

The second means to close the switch b may comprise a thermostatic switch such as the switch T of FIG. 2, advantageously located outside the passenger compartment of the vehicle and adjacent an outer wall thereof. The thermostatic switch and the two electrodes of the humidity detector are advantageously connected in the input circuit of an amplifier such as the amplifier 11, 13, 14, 15, 16 controlling the switch b, and indeed the contacts of the thermostatic switch such as the switch T of FIG. 2 may be connected electrically in parallel with the two electrodes of the humidity detector H.

The arrangement according to the invention may be such as is illustrated in FIG. 3 wherein the electrodes of the humidity detector H are so connected in the input to an amplifier such as the amplifier 37 of FIG. 3 that upon a decline in resistance between those electrodes the input signal applied to the amplifier increases in amplitude, so that the input signal varies inversely in amplitude with the value of the resistance between those electrodes. Instead of a thermostatic switch such as the switch T of FIG. 2, the means to close the switch *b* upon the appearance of a temperature below a specified value may take the form of a resistor such as the resistor T1 or the resistor T2 of FIG. 3 having a large temperature coefficient of resistivity, and connected with the amplifier to vary the gain thereof inversely with the temperature of that resistor. Separate resistors of large positive and negative temperature coefficient may be combined as are the thermistors T1 and T2 of FIG. 3 into a feedback loop of the amplifier so as to vary the gain of that amplifier in even more pronounced fashion inversely with the temperature of those thermistors.

While the invention has been described hereinabove in terms of a number of presently preferred embodiments thereof, the invention itself is not limited thereto but rather comprehends all modifications of and departures from those embodiments properly falling within the spirit and scope of the appended claims.

We claim:

1. Apparatus for heating a vehicle window comprising a plurality of heating conductors applied to the window, a switch for connection of said conductors to a source of electrical energy, first means to close said switch in response to the presence of water at a first location adjacent the window, and second means at a second location to close said switch, independently of the operation of said first means, upon appearance of a temperature below a specified value at said second location, wherein said second location is inside the vehicle at a region sheltered from the space heater of the vehicle and which reflects the temperature existing in the vicinity of said window.

2. Apparatus for heating a vehicle window comprising a plurality of heating conductors applied to the window, a switch for connection of said conductors to a source of electrical energy, first means to close said switch in response to the presence of water at a first location adjacent the window, and second means at a second location in said vehicle to close said switch upon appearance of a temperature below a specified value at said second location, said second location being one which is sheltered from the space heater of the vehicle, being one which is adjacent an outer all of the vehicle, and being one where the atmospheric conditions reflect those existing in the vicinity of the window which bears the conductors.

3. Apparatus according to claim 2 wherein said first means comprise two electrodes disposed in spaced apart relation on an insulating support and means responsive to a decline in the resistance between said conductors to close said switch.

4. Apparatus according to claim 3 wherein said electrodes are disposed on the surface of said window facing the inside of the vehicle.

5. Apparatus according to claim 3 wherein said second means to close said switch comprise a thermostatic switch.

6. Apparatus according to claim 5 wherein said thermostatic switch is connected in parallel with said two electrodes.

7. Apparatus according to claim 6 wherein said electrodes and thermostatic switch are connected in the input circuit of an amplifier controlling said first-named switch.

8. Apparatus according to claim 3 wherein said means responsive to a decline in resistance include an amplifier receiving as input a signal varying inversely in amplitude with the value of said resistance and having its output connected to control said first-named switch, and wherein said second means to close said first-named switch comprise at least one resistor having a large temperature coefficient of resistivity connected with said amplifier to vary the gain thereof inversely with the temperature of said resistor.

9. Apparatus according to claim 3 wherein said means responsive to a decline in resistance includes an amplifier receiving as input a signal varying inversely with the value of said resistance and having its output connected to control said first-named switch, and wherein said second means to control said first-named switch comprises a thermistor of positive temperature coefficient, a thermistor of negative temperature coefficient, and means connecting said thermistors into a feedback loop of said amplifier.

* * * * *

UNITED STATES PATENT OFFICE
CERTIFICATE OF CORRECTION

Patent No. 3,934,111  Dated January 22, 1976

Inventor(s) Sergio Roselli et al.

It is certified that error appears in the above-identified patent and that said Letters Patent are hereby corrected as shown below:

Column 7, line 64, start a new paragraph with

"2. Formation of...."

Column 8, line 2, for "by" read -- be -- .

Column 10, line 5, for "all" read -- wall -- .

Signed and Sealed this eighth Day of June 1976

[SEAL]

Attest:

RUTH C. MASON
Attesting Officer

C. MARSHALL DANN
Commissioner of Patents and Trademarks